(12) United States Patent
Walker et al.

(10) Patent No.: US 10,106,325 B2
(45) Date of Patent: Oct. 23, 2018

(54) CHAIN CONVEYOR WITH CAST SECTIONS

(71) Applicant: Joy MM Delaware, Inc., Wilmington, DE (US)

(72) Inventors: Aaron Philip Walker, Evans City, PA (US); Christopher George Stewart, Oil City, PA (US)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

(21) Appl. No.: 15/913,848

(22) Filed: Mar. 6, 2018

(65) Prior Publication Data

US 2018/0251308 A1 Sep. 6, 2018

Related U.S. Application Data

(60) Provisional application No. 62/467,761, filed on Mar. 6, 2017, provisional application No. 62/467,766, filed (Continued)

(51) Int. Cl.
*B65G 19/20* (2006.01)
*B65G 23/06* (2006.01)
(Continued)

(52) U.S. Cl.
CPC ............. *B65G 19/20* (2013.01); *B65G 17/40* (2013.01); *B65G 17/44* (2013.01); *B65G 19/08* (2013.01); *B65G 19/24* (2013.01); *B65G 23/06* (2013.01); *B65G 2201/045* (2013.01); *B65G 2812/0297* (2013.01)

(58) Field of Classification Search
CPC .. B65G 17/061; B65G 17/065; B65G 17/066; B65G 17/08; B65G 17/083; B65G 17/086; B65G 17/385; B65G 17/40; B65G 17/42; B65G 17/44; B65G 19/08; B65G 19/20;
(Continued)

(56) References Cited

U.S. PATENT DOCUMENTS 231,186 A 8/1880 Neacy
708,924 A 9/1902 Scott et al.
(Continued)

OTHER PUBLICATIONS

International Search Report with Written Opinion for Application No. PCT/US18/21231 dated May 9, 2018 (25 pages).

*Primary Examiner* — Gene O Crawford
*Assistant Examiner* — Keith R Campbell
(74) *Attorney, Agent, or Firm* — Michael Best & Friedrich LLP

(57) ABSTRACT

A conveyor chain includes first link, a second link, a connecting link, a first flight, and a second flight. The first link includes a first side portion and a second side portion. The first side portion has apertures and a first drive pin disposed between the apertures. The first drive pin is configured to be driven by a first sprocket. The second side portion has apertures and a second drive pin disposed between the apertures and extending in a direction opposite the first drive pin. The second drive pin is configured to be driven by a second sprocket. The second link includes a first side portion and a second side portion. The first flight is cast integrally with an end of the first drive pin of the first link, and the second flight is cast integrally with an end of the second drive pin of the first link.

17 Claims, 7 Drawing Sheets

Related U.S. Application Data on Mar. 6, 2017, provisional application No. 62/467,767, filed on Mar. 6, 2017, provisional application No. 62/467,769, filed on Mar. 6, 2017, provisional application No. 62/467,770, filed on Mar. 6, 2017, provisional application No. 62/467,773, filed on Mar. 6, 2017.

(51) Int. Cl.
  *B65G 17/40* (2006.01)
  *B65G 19/24* (2006.01)
  *B65G 19/08* (2006.01)
  *B65G 17/44* (2006.01)

(58) Field of Classification Search
  CPC ........ B65G 19/22; B65G 19/24; B65G 23/06; B65G 2201/045; B65G 2812/0297
  USPC .......................................... 198/851, 852, 853
  See application file for complete search history.

(56) References Cited

U.S. PATENT DOCUMENTS

| | | |
|---|---|---|
| 1,008,890 A | 11/1911 | Demarest |
| 1,020,863 A | 3/1912 | Weichseldorfer |
| 1,153,375 A | 9/1915 | Elliott |
| 1,427,229 A | 8/1922 | Robbins et al. |
| 1,699,334 A * | 1/1929 | Petersen ............... B65G 19/08 198/733 |
| 2,450,501 A | 10/1948 | Clarkson |
| 2,674,365 A | 4/1954 | Russell |
| 2,754,957 A | 7/1956 | Dodson |
| 2,761,548 A | 9/1956 | Long |
| 3,103,275 A | 9/1963 | Rollins |
| 3,119,276 A | 1/1964 | Pearson |
| 3,225,897 A | 12/1965 | Rollins |
| 3,324,990 A * | 6/1967 | Karlovsky, Jr. ........ B65G 19/08 198/733 |
| 3,452,228 A | 6/1969 | Woolley |
| 3,540,566 A | 11/1970 | Perry et al. |
| 3,602,364 A | 8/1971 | Maglio et al. |
| 4,175,797 A | 11/1979 | Krekeler |
| 4,202,219 A | 5/1980 | Weis |
| 4,218,932 A | 8/1980 | McComber |
| 4,238,028 A | 12/1980 | Lake |
| 4,461,372 A | 7/1984 | Bekkala et al. |
| 4,585,117 A | 4/1986 | Hahn |
| 4,766,995 A * | 8/1988 | Sterwerf, Jr. .......... B65G 19/08 198/733 |
| 4,844,314 A | 4/1989 | Wilson, III |
| 4,899,868 A | 2/1990 | Johnson |
| 4,917,658 A | 4/1990 | Sugimoto et al. |
| 4,964,344 A | 10/1990 | Robinson |
| 5,000,310 A | 3/1991 | Edmondson |
| 5,056,651 A | 10/1991 | Nagamatsu |
| 5,088,594 A | 2/1992 | Edmondson |
| 5,096,048 A | 3/1992 | Lachner et al. |
| 5,156,256 A | 10/1992 | David |
| 5,165,766 A | 11/1992 | Thomas |
| 5,186,526 A | 2/1993 | Pennington |
| 5,213,199 A | 5/1993 | Braun et al. |
| 5,226,526 A | 7/1993 | O'Brien |
| 5,305,872 A | 4/1994 | Hutton |
| 6,640,534 B1 | 11/2003 | Harnaes et al. |
| 6,662,932 B1 | 12/2003 | O'Neill |
| 7,036,657 B1 | 5/2006 | Robinson |
| 7,118,648 B2 | 10/2006 | Dever et al. |
| 7,422,256 B2 | 9/2008 | Mueller |
| 7,438,180 B1 | 10/2008 | Taylor et al. |
| 7,997,402 B2 | 8/2011 | Merten et al. |
| 8,016,102 B2 | 9/2011 | Morris |
| 8,038,558 B2 | 10/2011 | Klabisch et al. |
| 8,141,696 B2 | 3/2012 | O'Neill |
| 8,177,049 B2 | 5/2012 | O'Neill |
| 8,360,912 B2 | 1/2013 | Klabisch et al. |
| 8,448,781 B2 | 5/2013 | Morris |
| 8,453,826 B2 * | 6/2013 | Morris ................... B65G 19/08 198/730 |
| 8,672,110 B2 | 3/2014 | Jaeger |
| 8,936,146 B2 | 1/2015 | Morris |
| 8,950,571 B2 | 2/2015 | O'Neill |
| 8,978,877 B2 * | 3/2015 | O'Neill ................. B65G 19/08 198/730 |
| 9,227,787 B2 | 1/2016 | Morris et al. |
| 9,434,428 B2 | 9/2016 | Hakes et al. |
| 9,487,358 B2 | 11/2016 | Morris et al. |
| 2002/0129732 A1 | 9/2002 | Marshall |
| 2004/0140182 A1 | 7/2004 | Morris |
| 2005/0176539 A1 | 8/2005 | Hirschmann |
| 2005/0027459 A1 | 12/2005 | Kwiat |
| 2005/0274590 A1 | 12/2005 | Kwiat |
| 2006/0172841 A1 | 8/2006 | Nunez et al. |
| 2007/0107412 A1 | 5/2007 | Humcke et al. |
| 2009/0218199 A1 | 9/2009 | Russell |
| 2009/0250318 A1 | 10/2009 | O'Neill |
| 2009/0318239 A1 | 12/2009 | Kampf |
| 2010/0276254 A1 | 11/2010 | O'Neill |
| 2011/0067793 A1 | 3/2011 | Nukushina |
| 2011/0315521 A1 | 12/2011 | O'Neill |
| 2012/0048684 A1 | 3/2012 | Morris |
| 2013/0203539 A1 | 8/2013 | Kirchner et al. |
| 2013/0227833 A1 | 9/2013 | Rizzo |
| 2013/0284569 A1 | 10/2013 | Studer |
| 2013/0334015 A1 | 12/2013 | Lasecki |
| 2014/0027247 A1 | 1/2014 | Cox et al. |
| 2014/0239699 A1 | 8/2014 | O'Neill |
| 2015/0101912 A1 * | 4/2015 | Morris ................... B65G 19/08 198/731 |
| 2015/0191313 A1 * | 7/2015 | Arnold ................... B65G 19/24 198/731 |
| 2015/0266527 A1 | 9/2015 | Akinlua et al. |
| 2015/0353152 A1 | 12/2015 | Hakes et al. |
| 2016/0159417 A1 | 6/2016 | Zimmer et al. |
| 2016/0200520 A1 | 7/2016 | Menke et al. |
| 2017/0137226 A1 | 5/2017 | Morris et al. |

* cited by examiner

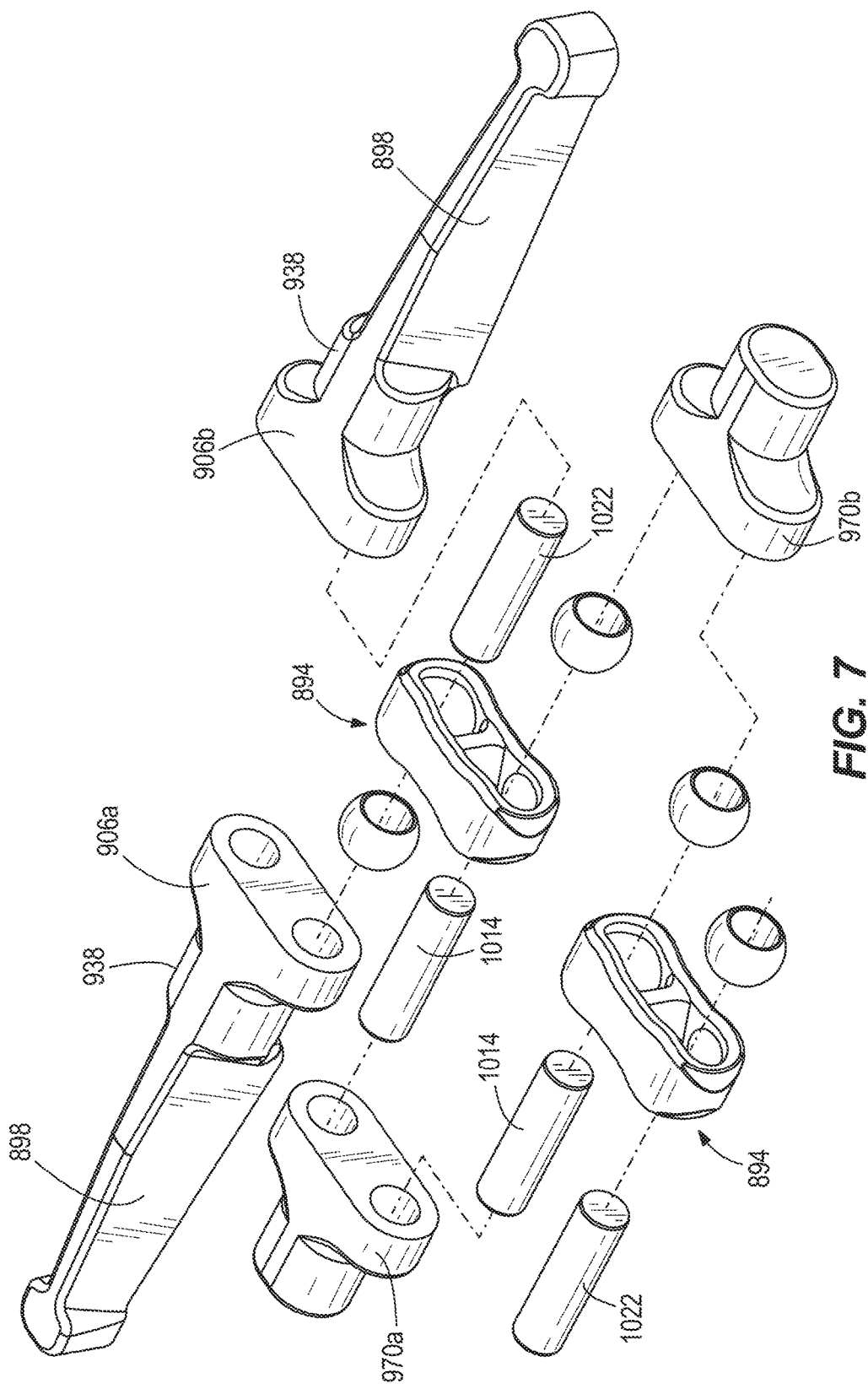

CHAIN CONVEYOR WITH CAST SECTIONS

CROSS-REFERENCE TO RELATED APPLICATIONS

This application claims the benefit of prior-filed, U.S. Provisional Patent Application No. 62/467,761, filed Mar. 6, 2017; U.S. Provisional Patent Application No. 62/467,766, filed Mar. 6, 2017; U.S. Provisional Patent Application No. 62/467,767, filed Mar. 6, 2017; U.S. Provisional Patent Application No. 62/467,769, filed Mar. 6, 2017; U.S. Provisional Patent Application No. 62/467,770, filed Mar. 6, 2017; and U.S. Provisional Patent Application No. 62/467,773, filed Mar. 6, 2017. The entire contents of each of these documents are incorporated by reference herein.

BACKGROUND

The present disclosure relates to material conveyors, and particularly to chain and flight conveyors.

SUMMARY

Mining machines such as continuous miners and chain haulage units may include chain conveyors that are capable of deflecting laterally in order to travel through lateral turns. The chain conveyors may include flight members for pushing or urging material along a pan. The chain may be driven by one or more sprockets.

In one embodiment, a conveyor chain for a mining machine includes a first link, a second link, and a connecting link coupled between the first link and the second link. The first link is cast as a unitary piece and includes a first side portion and a second side portion. The first side portion has a first aperture, a second aperture, and a first drive pin disposed between the first aperture and the second aperture. The first drive pin is configured to be driven by a first sprocket. The second side portion has a first aperture, a second aperture, and a second drive pin disposed between the first aperture and the second aperture and extending in a direction opposite the first drive pin. The second drive pin is configured to be driven by a second sprocket. The second link cast as a unitary piece and includes a first side portion and a second side portion. The first side portion has a first aperture, a second aperture, and a first drive pin disposed between the first aperture and the second aperture. The first drive pin is configured to be driven by the first sprocket. The second side portion has a first aperture, a second aperture, and a second drive pin disposed between the first aperture and the second aperture and extending in a direction opposite the first drive pin. The second drive pin is configured to be driven by a second sprocket.

In another embodiment, a conveyor chain includes a first link, a second link, a connecting link coupled between the first link and the second link, a first flight and a second flight. The first link includes a first side portion and a second side portion. The first side portion has a first aperture, a second aperture, and a first drive pin disposed between the first aperture and the second aperture. The first drive pin is configured to be driven by a first sprocket. The second side portion has a first aperture, a second aperture, and a second drive pin disposed between the first aperture and the second aperture and extending in a direction opposite the first drive pin. The second drive pin is configured to be driven by a second sprocket. The second link includes a first side portion and a second side portion. The first side portion has a first aperture, a second aperture, and a first drive pin disposed between the first aperture and the second aperture. The first drive pin is configured to be driven by a first sprocket. The second side portion has a first aperture, a second aperture, and a second drive pin disposed between the first aperture and the second aperture and extending in a direction opposite the first drive pin. The second drive pin is configured to be driven by the second sprocket. The first flight is cast integrally with an end of the first drive pin of the first link, and the second flight is cast integrally with an end of the second drive pin of the first link.

Other aspects will become apparent by consideration of the detailed description and accompanying drawings.

BRIEF DESCRIPTION OF THE DRAWINGS

FIG. 7 is an exploded view of the chain conveyor unit of FIG. 6.

Figure 1:
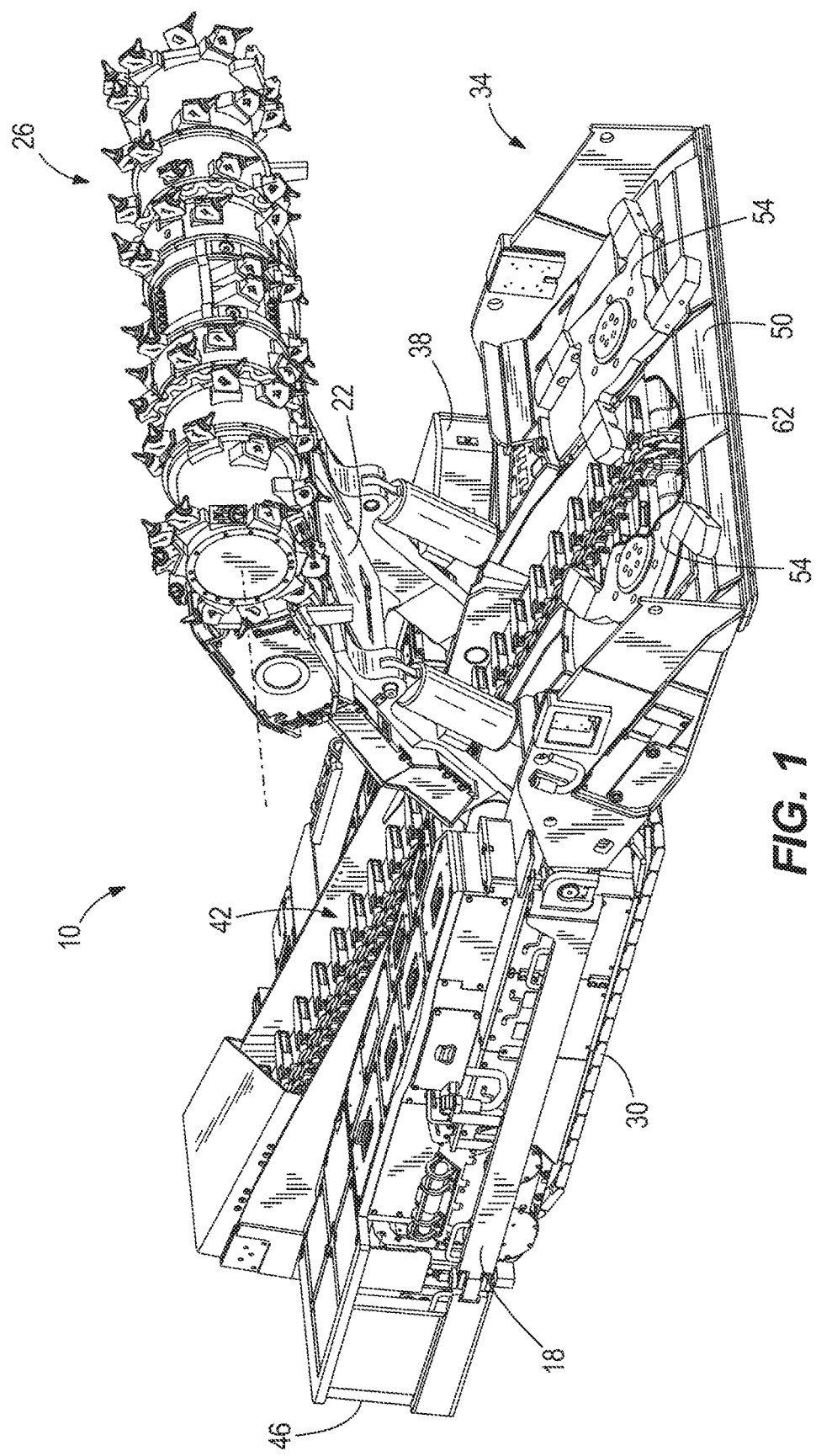
FIG. 1 is a perspective view of a mining machine.

Before any independent embodiments of the disclosure is explained in detail, it is to be understood that the disclosure is not limited in its application to the details of the construction and the arrangements of components set forth in the following description or illustrated in the drawings. The disclosure is capable of other independent embodiments and of being practiced or being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or fluid connections or couplings, whether direct or indirect. Also, electronic communications and notifications may be performed using any known means including direct connections, wireless connections, etc.

DETAILED DESCRIPTION

FIG. 1 illustrates a mining machine 10, such as a continuous mining machine. In the illustrated embodiment, the mining machine 10 includes a frame or chassis 18, a boom 22 pivotably coupled to the chassis 18, and a cutter head 26 supported on the boom 22. The chassis 18 may be supported for movement relative to a support surface (not shown) by a traction mechanism (e.g., crawlers 30).

Figure 2:
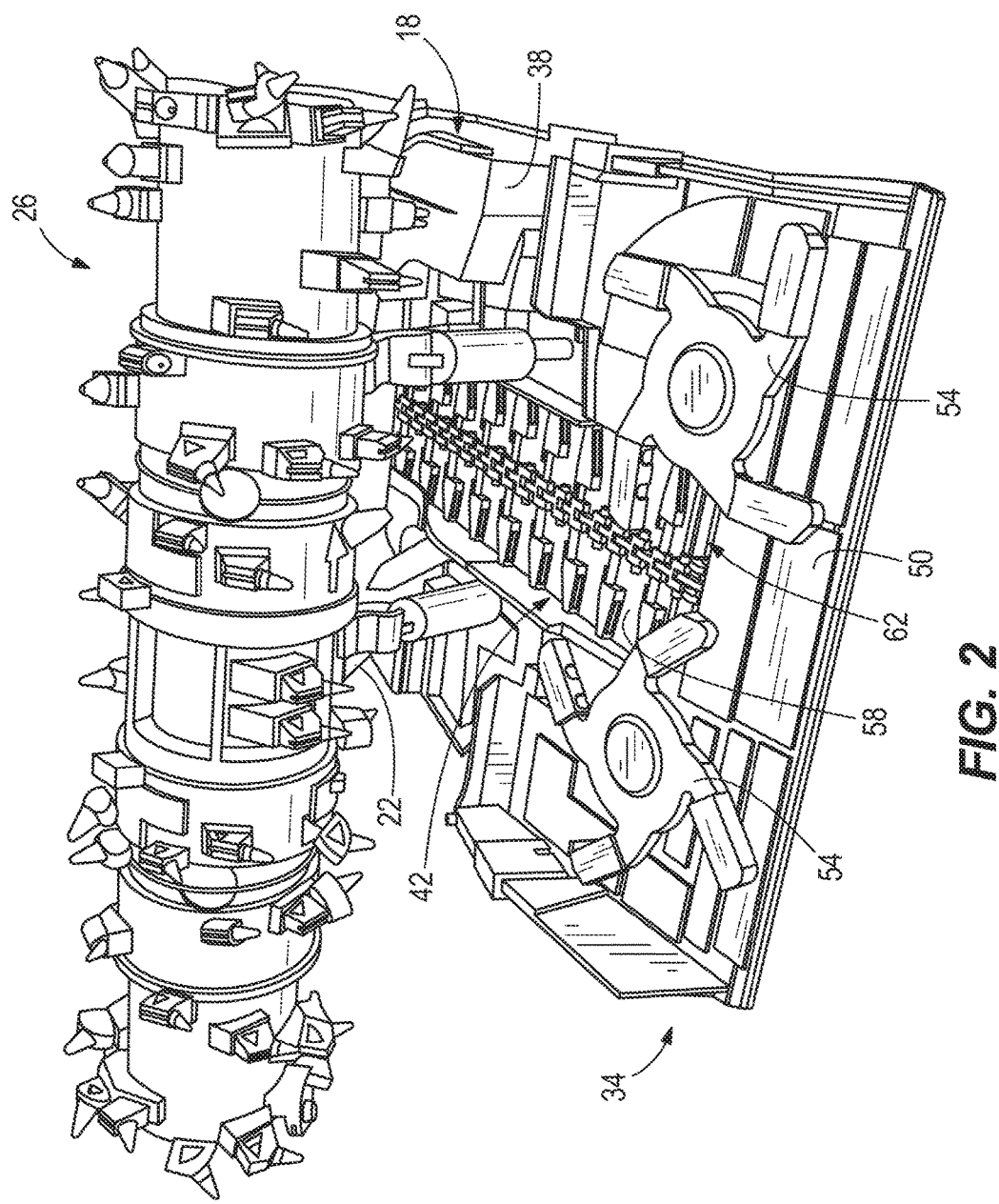
FIG. 2 is a perspective view of a forward end of the mining machine of FIG. 1.

As shown in FIGS. 1 and 2, a collecting mechanism or gathering head 34 is positioned adjacent a first end or forward end 38 of the chassis 18, and a conveyor 42 extends in a continuous loop from the forward end 38 of the chassis 18 toward a second or rear end 46 of the chassis 18. The gathering head 34 is positioned below the cutter head 26 and includes a deck 50 and a pair of rotating arms 54 that engage and direct dislodged material onto the conveyor 42. The conveyor 42 transports the cut material from the forward end 38 toward the rear end 46 (FIG. 1) of the chassis 18, from the area below the cutter head 26 to another conveyor or a haulage machine (not shown) positioned proximate the rear end 46 of the chassis 18.

Figure 3:
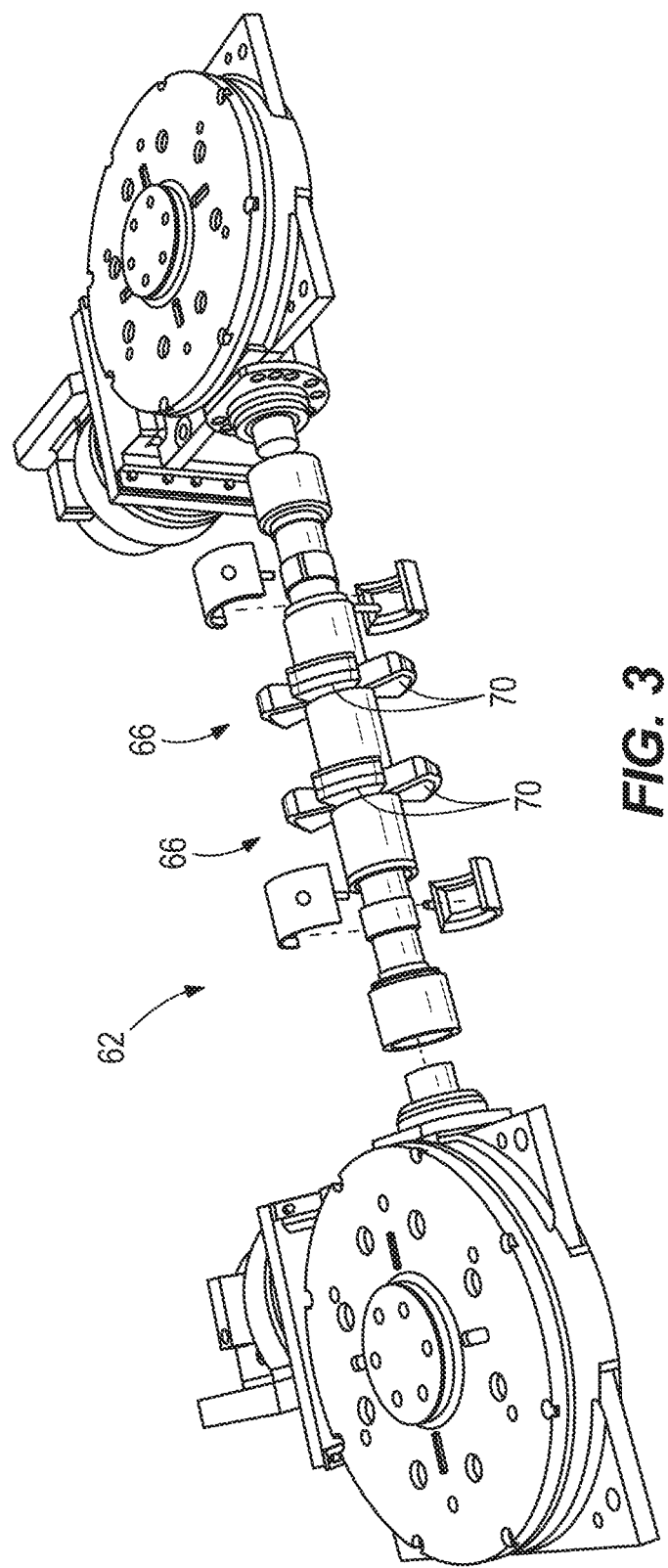
FIG. 3 is an exploded view of a conveyor drive assembly.

As shown in FIG. 2, the conveyor 42 is a chain conveyor formed by chain links connected sequentially in a continuous loop. The conveyor 42 drives cut material along a chain pan or deck 58. The conveyor 42 is driven by a drive assembly including a shaft 62 positioned adjacent the gathering head 34 of the chassis 18. As shown in FIG. 3, the shaft 62 is oriented laterally relative to the chassis 18 (FIG. 2) and is driven (e.g., by one or more motors) to rotate relative to the chassis 18. The shaft 62 includes a pair of sprockets 66 for engaging and moving the conveyor 42. In the illustrated embodiment, each sprocket 66 includes four teeth or lobes 70 spaced apart about the shaft 62, and recesses between the lobes 70 receive and drive the conveyor 42.

Figure 4:
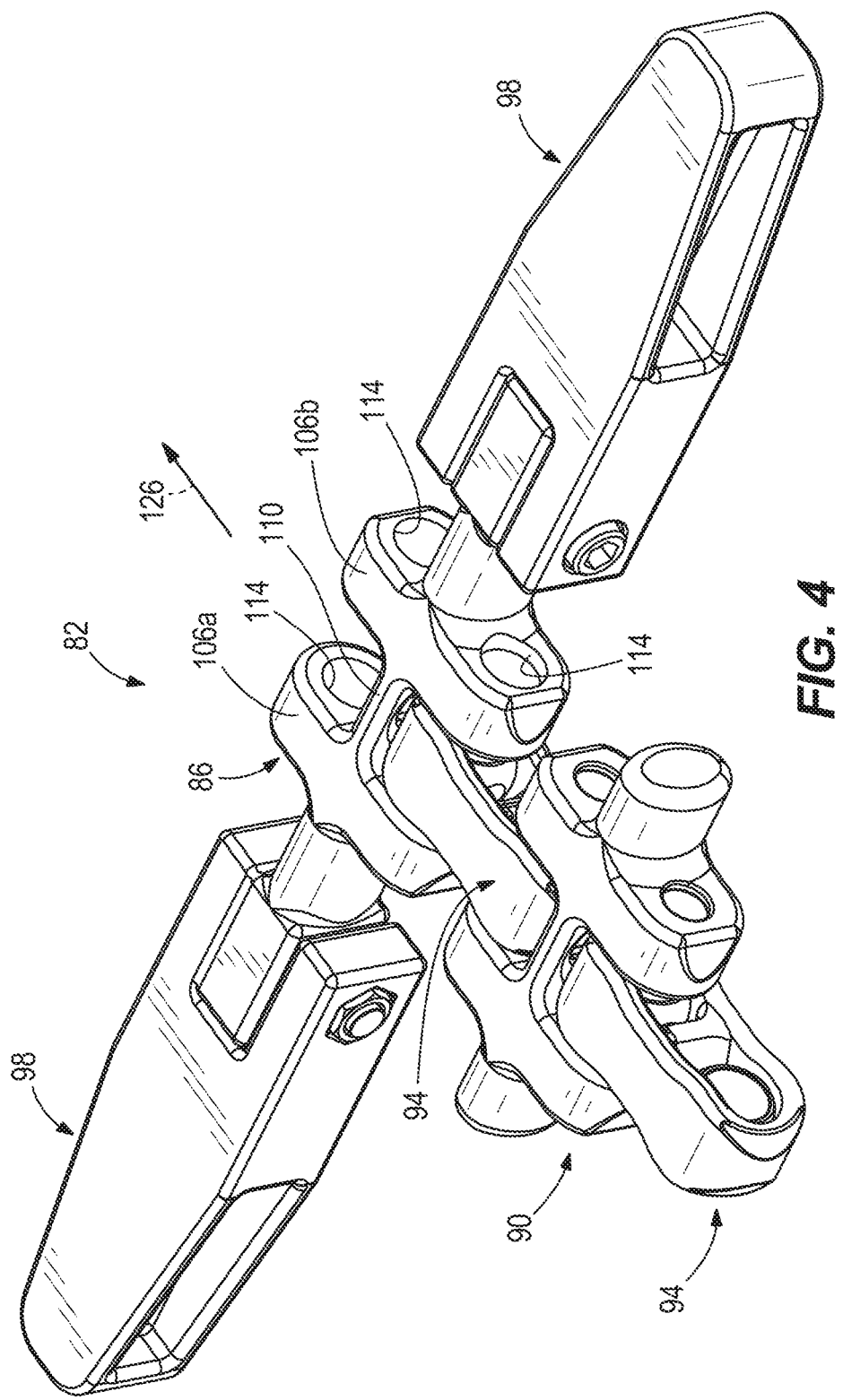
FIG. 4 is a perspective view of a chain conveyor unit.
Figure 5:
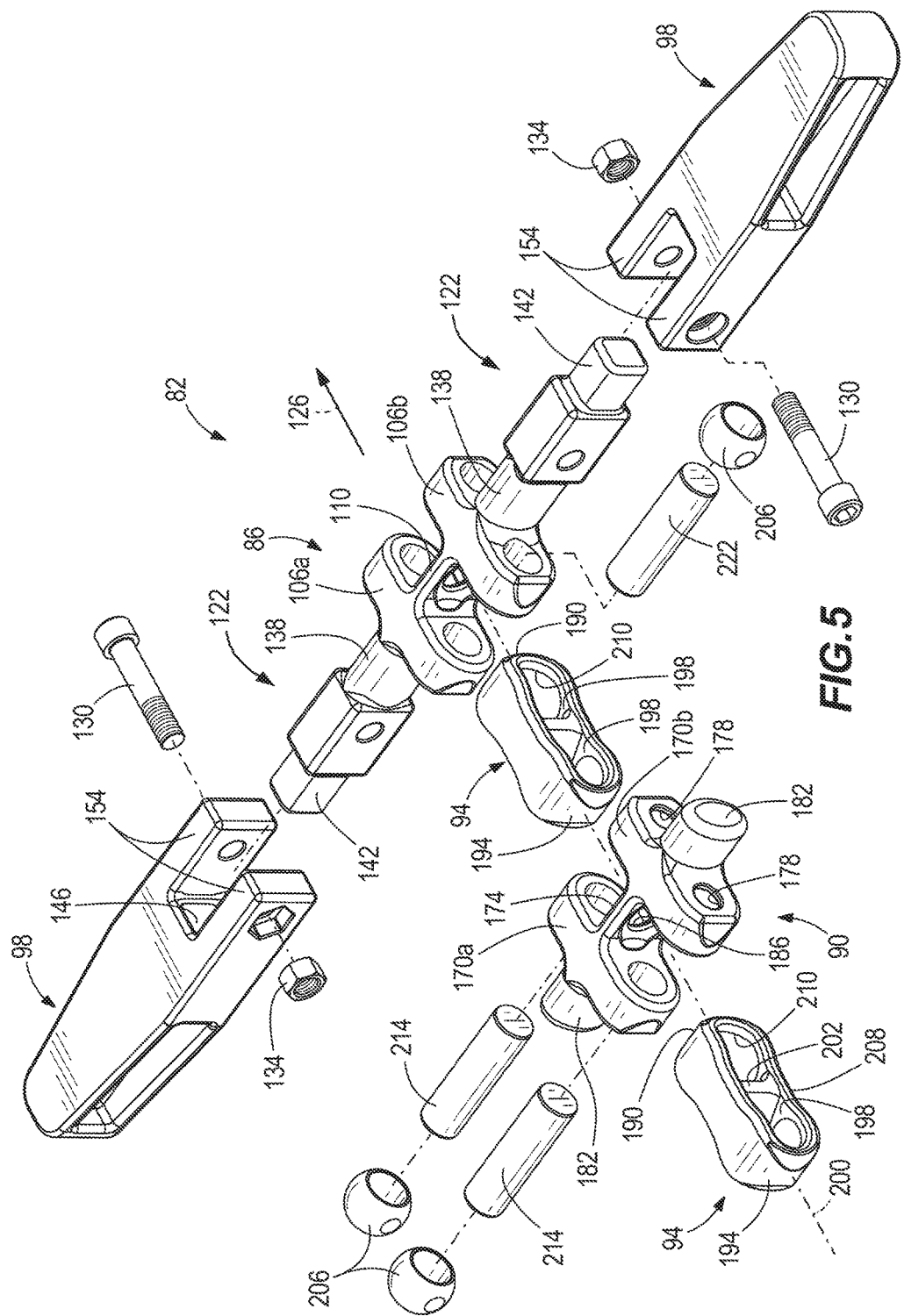
FIG. 5 is an exploded view of the chain conveyor unit of FIG. 4.

FIGS. 4 and 5 show a unit of the chain 82 that forms the conveyor 42. In the illustrated embodiment, the chain 82 includes a first link or flight link 86, a second link or connecting link 90, a coupler link or swivel link 94 coupling the flight link 86 to the connecting link 90, and flights or flight bars 98 positioned laterally outward from the flight link 86. Another swivel link 94 may couple the connecting link 90 to another flight link (not shown), and the conveyor chain 82 may therefore include a sequence of alternating flight links and connecting links, each joined to one another by swivel links. In other embodiments, the chain 82 may include a different sequence of links—for example, multiple connecting links may be positioned between one flight link and the subsequent flight link. Various permutations of the links are possible.

In the illustrated embodiment, the flight link 86 includes a pair of lugs or side portions 106 (a first side portion 106a and a second side portion 106b) and a bridge 110 extending between inner surfaces of the side portions 106. Each side portion 106 includes a pair of apertures 114 extending through the inner surface and an outer surface of each side portion 106.

As best shown in FIG. 5, the flight link 86 further includes a pair of flight pins 122, and each flight pin 122 extends outwardly from the outer surface of one of the side portions 106. In the illustrated embodiment, the flight pins 122 are aligned with one another (i.e., along a common axis), and each of the flight pins 122 is positioned between the chain pins 222 (described in further detail below). Stated another way, the flight pins 122 extend laterally or transversely relative to a direction of travel 126 of the conveyor 42. Each of the flight pins 122 is positioned between the apertures 114 of the associated side portion 106. In the illustrated embodiment, the flight bar 98 is coupled to one of the flight pins 122 (e.g., by a threaded bolt 130 and nut 134). A sprocket-engaging portion or drive portion 138 of each flight pin 122 is positioned between the side portion 106 and the associated flight bar 98. In the illustrated embodiment, an end portion 142 of each flight pin 122 is positioned within an opening 146 of one of the flight bars 98.

As shown in FIG. 5, each connecting link 90 includes a pair of lugs or side portions 170 (a first side portion 170a and a second side portion 170b) and a bridge 174 extending between inner surfaces of the side portions 170. Each side portion 170 includes a pair of apertures 178 extending through the inner surface and an outer surface of each side portion 170. In addition, a drive pin 182 extends outwardly from an outer surface of each side portion 170. Stated another way, each drive pin 182 extends laterally or transversely relative to the direction of travel 126 of the chain 82. Each drive pin 182 is positioned between the apertures 178 of the associated side portion 170. The sprockets 66 (FIG. 3) engage the drive pins 182 and the drive portions 138 of the flight pins 122 to drive the chain 82. In the illustrated embodiment, the bridge 174 of the connecting link 90 includes an opening 186.

Referring now to FIG. 5, the swivel link 94 includes a first end 190, a second end 194, and a pair of openings 198 extending laterally from one side of the swivel link 94 to another, opposite side of the swivel link 94. A swivel link longitudinal axis 200 extends between the first end 190 and the second end 194. Under nominal operating conditions, the swivel link longitudinal axis 200 is aligned with the direction of travel 126 of the chain 82. In the illustrated embodiment, the swivel link 94 is formed as a vertical open chain link in which the openings 198 are separated by a gusset or reinforcement member 202. Each swivel link 94 further includes a pair of support members or bearings, such as spherical bearings 206. Each bearing 206 is positioned in a pocket 210 formed in an associated one of the openings 198 of the swivel link 94.

One of the openings 198 is aligned with parallel apertures 178 in the side portions 170 of the connecting link 90, while the other opening 198 is aligned with parallel apertures 114 in the side portions 106 of the flight link 86. A first connecting pin or first chain pin 214 is inserted through the apertures 178 of the connecting link side portions 170 and through one opening 198 of the swivel link 94, thereby coupling the swivel link 94 to the connecting link 90. Similarly, a second connecting pin or second chain pin 222 is inserted through the apertures 114 of the flight link side portions 106 and through the other opening 198 of the swivel link 94, thereby coupling the swivel link 94 to the flight link 86. Each of the chain pins 214, 222 is supported for pivoting movement relative to the swivel link 94 by one of the bearings 206 positioned in the connected swivel link 94.

In the illustrated embodiment, the first chain pin 214 is inserted through the connecting link side portions 170 in a first lateral direction, while the second chain pin 222 is inserted through the flight link side portions 106 in a second lateral direction opposite the first lateral direction. The chains pins 214, 222 are secured against movement relative to the connecting link 90 and flight link 86 by retainers (e.g., self-locking retaining rings—not shown). For example, an outer side of one of the side portions 170 may include an aperture having a reduced diameter such that each pin 214 can only be inserted from one side of the connecting link to the other. The apertures 114 of the flight link 86 may be structured in a similar manner.

In the illustrated embodiment, the flight link 86, the connecting link 90, the swivel link 94, and the flight bars 98 are formed by casting. In particular, each of these components is cast in austempered ductile iron. In other embodiments, the components could be cast in another material. Also, additional components may be cast in this or another material. In other embodiments, only some of the flight link 86, connecting link 90, swivel link 94, and flight bars 98 may be cast. Unlike forged steel components used in conventional chains, the cast chain components may be made from a cast base material that has a near net shape with many features formed in the casting, thereby reducing any additional machining that would be required to provide a finished part in a traditional forging. In additional, the cast components provide improved wear properties and lower cost.

In addition, in the illustrated embodiment the cast components are formed in austempered ductile iron with an outer surface that may be laser hardened. The laser hardening improves wear resistance without decreasing the toughness of the core material. That is, the highly ductile core material maintains the overall toughness and resilience of the parts, reducing the parts' vulnerability to impact damage compared to conventional chain components.

Figure 6:
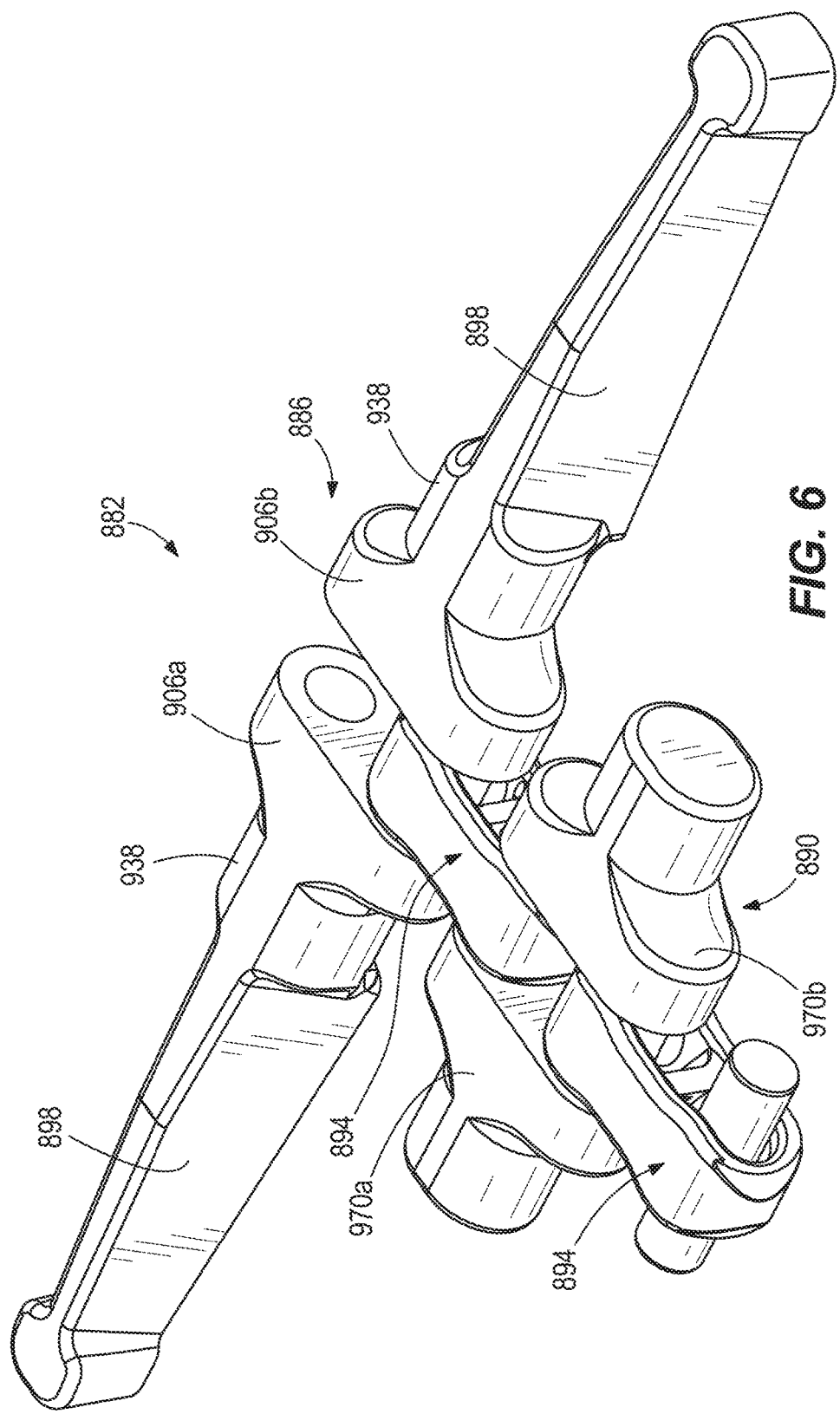
FIG. 6 is a perspective view of a chain conveyor unit according to another embodiment.

FIGS. 6 and 7 illustrate a chain 882 according to another embodiment. Features of the chain 882 are similar to features of the chain 82 and are identified with similar reference numbers, plus 800. For the sake of brevity, only differences between the chain 82 and 882 are described below. In addition, components or features described with respect to only one or some of the embodiments described herein are equally applicable to any other embodiments described herein.

The chain 882 includes a flight link 886 including a pair of side portions 906 that are separate from one another and not directly connected. Stated another way, the flight link 886 does not include a bridge between the side portions 906. Rather, the side portions 906 are coupled to one another by the connecting pins 1022 (FIG. 7) extending between the side portion 906 and through a swivel link 894. Similarly, a connecting link 890 includes a pair of side portions 970 that are separate from one another and not directly connected. Stated another way, the connecting link 886 does not include a bridge between the side portions 970, which are formed as separate components 970*a*, 970*b*. Rather, the side portions 970 are coupled to one another by the connecting pins 1014 (FIG. 7) extending between the side portion 970 and through the swivel link 894.

In addition, a flight 898 is formed integrally with each side portion 906 of the flight link 886. In the illustrated embodiment, a drive portion 938 protrudes from each side portion 906, and the flight 898 extends laterally outwardly from an end of the drive portion 938. The drive portion 938 is positioned between the side portion 906 and the flight 898. It is understood that aspects of the chain 882 may be incorporated into other disclosed embodiments. For example, an integral flight may be incorporated into the flight link 86 described above with respect to FIGS. 4 and 5.

Although the conveyor is described above with respect to a continuous mining machine, it is understood that the conveyor may be incorporated into other types of machines including but not limited to roadheaders and entry drivers, as well as loading and hauling machines including but not limited to shuttle cars, battery haulers, or other types.

Although aspects have been described in detail with reference to certain preferred embodiments, variations and modifications exist within the scope and spirit of one or more independent aspects as described.

What is claimed is:

1. A conveyor chain for a mining machine, the conveyor chain comprising:
a first link cast as a unitary piece including,
a first side portion having a first aperture, a second aperture, and a first drive pin disposed between the first aperture and the second aperture, the first drive pin configured to be driven by a first sprocket, and
a second side portion having a first aperture, a second aperture, and a second drive pin disposed between the first aperture and the second aperture and extending in a direction opposite the first drive pin, the second drive pin configured to be driven by a second sprocket;
a second link cast as a unitary piece including,
a first side portion having a first aperture, a second aperture, and a first drive pin disposed between the first aperture and the second aperture, the first drive pin configured to be driven by the first sprocket, and
a second side portion having a first aperture, a second aperture, and a second drive pin disposed between the first aperture and the second aperture and extending in a direction opposite the first drive pin, the second drive pin configured to be driven by the second sprocket; and
a connecting link coupled between the first link and the second link.

2. The conveyor chain of claim 1, wherein the first link and the second link are cast in austempered ductile iron.

3. The conveyor chain of claim 1, wherein an outer surface of the first link and the second link are hardened by a laser hardening process.

4. The conveyor chain of claim 1, wherein
the connecting link includes a first opening positioned proximate the first apertures of the first link and a second opening positioned proximate the first apertures of the second link;
a first pin received within the first apertures of the first link and the first opening to couple the first link to the connecting link; and
a second pin received within the first apertures of the second link and the second opening to couple the second link to the connecting link.

5. The conveyor chain of claim 4, wherein the first pin and the second pin are each insertable in only one direction.

6. The conveyor chain of claim 1, wherein
the first link includes a first bridge integrally formed between the first side portion and the second side portion; and
the second link includes a second bridge integrally formed between the first side portion and the second side portion.

7. The conveyor chain of claim 1, wherein the connecting link is disposed between the first and second side portions of the first link and between the first and second side portions of the second link.

8. The conveyor chain of claim 1, wherein the first drive pin of the first link is disposed between the first side portion of the first link and a flight, the flight is coupled to the first drive pin of the first link with a fastening member.

9. The conveyor of claim 8, wherein the flight is a first flight, the conveyor chain further comprising a second flight, wherein the second drive pin of the first link is disposed between the second side portion of the first link and the second flight, the second flight is coupled to the second drive pin of the first link with a fastening member.

10. A conveyor chain comprising:
a first link including,
a first side portion having a first aperture, a second aperture, and a first drive pin aligned between the first aperture and the second aperture, the first drive pin configured to be driven by a first sprocket, and
a second side portion having a first aperture, a second aperture, and a second drive pin aligned between the first aperture and the second aperture and extending in a direction opposite the first drive pin, the second drive pin configured to be driven by a second sprocket;
a second link including,
a first side portion having a first aperture, a second aperture, and a first drive pin disposed between the first aperture and the second aperture, the first drive pin configured to be driven by a first sprocket, and a second side portion having a first aperture, a second aperture, and a second drive pin disposed between the first aperture and the second aperture and extending in a direction opposite the first drive pin, the second drive pin configured to be driven by the second sprocket;

a connecting link coupled between the first link and the second link;

a first flight cast integrally with an end of the first drive pin of the first link; and a second flight cast integrally with an end of the second drive pin of the first link.

11. The conveyor chain of claim 10, wherein the first link and the second link are cast in austempered ductile iron.

12. The conveyor chain of claim 10, wherein an outer surface of the first link and the second link are hardened by a laser hardening process.

13. The conveyor chain of claim 10, wherein the connecting link is disposed between the first and second side portions of the first link and between the first and second side portions of the second link.

14. The conveyer of claim 10, wherein the connecting link includes a first opening aligned with the first apertures of the first link and a second opening aligned with the first apertures of the second link;

a first pin received within the first apertures of the first link and extending through the first opening to couple the first link to the connecting link; and a second pin received within the first apertures of the second link and extending through the second opening to couple the second link to the connecting link.

15. The conveyor chain of claim 14, wherein each of the first pin and the second pin is insertable into each aperture in only one direction.

16. The conveyor chain of claim 10, wherein the first portion of the first link includes an inner surface positioned adjacent a chain axis and an outer surface from which the first drive pin protrudes, the first aperture and the second aperture formed on the inner surface and extending partially through the first portion toward the outer surface, the second portion of the first link including an inner surface facing the inner surface of the first portion and an outer surface from which the second drive pin protrudes, the first aperture and the second aperture of the second portion formed on the inner surface and extending partially through the second portion toward the outer surface.

17. The conveyor chain of claim 10, wherein the first side portion and the second side portion of the first link are separable; and the first side portion and the second side portion of the second link are separable.

\* \* \* \* \*